(12) United States Patent
Bosc et al.

(10) Patent No.: US 6,185,033 B1
(45) Date of Patent: Feb. 6, 2001

(54) HYBRID INTEGRATED ELECTRO-OPTICAL MODULATOR OF THE POCKELS EFFECT TYPE

(75) Inventors: Dominique Bosc, Lannion; Pierre Benech, Grenoble; Smaïl Tedjini, Valence; Alain Morand, Grenoble, all of (FR)

(73) Assignee: France Telecom (FR)

( * ) Notice: Under 35 U.S.C. 154(b), the term of this patent shall be extended for 0 days.

(21) Appl. No.: 09/281,580

(22) Filed: Mar. 30, 1999

(30) Foreign Application Priority Data

Mar. 30, 1998 (FR) .................................. 98 03901

(51) Int. Cl.[7] .................. G02F 1/03; G02B 6/26
(52) U.S. Cl. .................. 359/254; 359/245; 359/257; 385/39; 385/40
(58) Field of Search .................. 359/254, 245, 359/276, 238, 240, 237, 257; 385/1, 2, 8, 9, 39, 40

(56) References Cited

U.S. PATENT DOCUMENTS

| | | | |
|---|---|---|---|
| 4,957,655 | * 9/1990 | Khanarian et al. | 252/299.01 |
| 5,265,178 | * 11/1993 | Braun et al. | 385/24 |
| 5,396,363 | 3/1995 | Valette | 359/248 |
| 5,400,416 | * 3/1995 | Enokihara et al. | 385/2 |
| 5,729,641 | 3/1998 | Chandonnet et al. | 385/2 |
| 5,930,412 | * 7/1999 | Toussaere | 385/3 |

FOREIGN PATENT DOCUMENTS

| | | | |
|---|---|---|---|
| 0961154A1 | * 12/1999 | (EP) | G02F/1/01 |
| 2238879 | 6/1991 | (GB) | G02F/1/03 |

OTHER PUBLICATIONS

Hill R A et al.; "Polymeric in–line fiber modulator using novel processing techniques" Optical Fiber Communication 1996, San Jose, Feb. 25–Mar. 1, 1996 vol. 2, No. CONG. 19, Feb. 25, 1996, pp. 166–167.

Wilkinson M et al: "Optical Fibre Modulator Using Electro–Optic Polymer Overlay" Electronics Letters, May 23, 1991, UK vol. 27, No. 11, pp. 979–981.

Fawcett G et al.: "In–line Fibre–Optic Intensity Modulatory Using Electro–Optic Polymer" Electronics Letters, May 21, 1992, UK vol. 28, No. 11, pp. 985–986.

* cited by examiner

*Primary Examiner*—Georgia Epps
*Assistant Examiner*—David N. Spector
(74) *Attorney, Agent, or Firm*—Blakely Sokoloff Taylor & Zafman

(57) ABSTRACT

A Pockels-effect electro-optical modulator including a light guide having a core made of an inorganic amorphous material, and on which a structure is superposed that is made up of two electrode-forming layers between which an electro-optical polymer is interposed, said modulator being characterized in that said structure is superposed directly on the material of the core of the light guide. The transitions between the active and passive zones are advantageously adapted to minimize losses.

10 Claims, 4 Drawing Sheets

HYBRID INTEGRATED ELECTRO-OPTICAL MODULATOR OF THE POCKELS EFFECT TYPE

BACKGROUND OF THE INVENTION

The present invention relates to electro-optical modulators.

More particularly, the invention proposes electro-optical modulators that are fast, i.e. that make it possible to obtain modulation frequencies of the order of 1 MHz or higher.

This type of modulator is, in particular, used advantageously in the field of optical telecommunications to transform an electrical signal into a modulated optical signal.

Such modulation is obtained either by modulating the transmitter laser internally, or else by performing modulation externally. External modulation may be performed by discrete components or by integrated optical components which use various physical effects such as, for example, acousto-optical effects, electro-absorption effects, or electro-optical effects. Among the latter effects, the most commonly used effect is the transverse electric Pockels effect which makes it possible to modulate the refractive index of the propagation medium in proportion to the electric field via an electro-optical coefficient. The electro-optical coefficient depends on the non-linear optical properties of the material used. Such a material is said to be "active" because its refractive index varies significantly with the electric field to which it is subjected.

The Pockels effect may be obtained with various types of material, and in particular with light guides made using:

suitable semiconductors;

inorganic or organic crystals that are not centrally symmetrical;

electro-optical polymers; or passive materials associated with electro-optical materials.

The invention relates to Pockels-effect electro-optical modulators whose light guides are made using passive materials associated with electro-optical materials.

The advantage of this type of structure is that it can be connected easily to other passive components on an optical integrated circuit platform.

For examples of Pockels-effect modulator structures using passive materials, reference may advantageously be made to the following publications:

M. Wilkinson et al., Electronics Letters, vol. 27 (11), p. 979, (1991);

R. A. Hill et al., Proceedings OFC'96, Technical Digest, WL1, P. 166, (1996); and G. Fawcett et al., Electronics Letters, vol. 28 (11), p. 985, (1992).

Usually, such modulator structures are constituted by passive waveguides which are made of silica or of glasses treated by ion exchange and on which respective polymer films are deposited. Such a structure takes advantage of the evanescent wave coupling that takes place between the core and the polymer at well-defined wavelengths, since the polymer has a refractive index that is considerably higher than the refractive index of the core.

Unfortunately, such a structure suffers from large losses at those wavelengths, and modulation takes place with power levels that are low.

BRIEF SUMMARY OF THE INVENTION

An object of the invention is to propose an electro-optical modulator of the above-mentioned type that does not suffer from that drawback and that makes it possible, with small optical losses, to obtain optical phase modulation analogous to the optical phase modulation obtained with cores made of active materials.

Another object of the invention is to propose a method that is simple to implement for manufacturing such a modulator.

To these ends, the invention provides a Pockels-effect electro-optical modulator including a light guide having a core made of an inorganic amorphous material, and on which a structure is superposed that is made up of two electrode-forming layers between which an electro-optical polymer is interposed, said structure being superposed directly on the material of the core of the light guide, said modulator being characterized in that it includes a layer of cladding-forming material which extends over the core material on either side of the structure comprising the two electrode-forming layers and the electro-optical polymer, and which, in the vicinity of said structure, has transition zones in which its thickness decreases down to the electrode superposed on the core material, the electro-optical polymer covering said cladding-forming material in the transition zones defined in this way.

Such a modulator may advantageously further include the following characteristics, taken singly or in any technically-feasible combination:

the electro-optical polymer is covered in a protective layer whose refractive index is lower than the refractive index of the core;

the electrode which is superposed on the core of the light guide is made of a material that is both electrically conductive and also transparent at the operating wavelength; and said material is a material based on tin oxide; and the structure comprising the two electrode-forming layers and the electro-optical polymer superposed on the core is of a length lying in the range 5 mm to 30 mm.

The invention also provides a method of making an electro-optical modulator of the above-mentioned type, said method being characterized by the following steps:

a structure is made that includes a light guide having a core that is unclad and that is made of an inorganic amorphous material;

a layer of a material serving to constitute cladding for said core is deposited on said structure;

said layer is etched through a mask;

an electrode is deposited in the bottom of the etched zone; and an electro-optical polymer is deposited on the electrode and on the edges of the etched zone.

In particular, the etching is performed by plasma etching, with the mask being spaced apart from the cladding.

Preferably, in order to space the mask apart from the cladding, shims are disposed between said mask and said cladding.

Advantageously, the polymer is deposited on the electrode and on the transition zones defined on the cladding during said etching.

In another variant, the following steps are implemented:

a structure is made that includes a light guide having a core that is unclad and that is made of an inorganic amorphous material;

cladding is deposited by plasma on said structure while interposing a mask facing the zone in which the electro-optical polymer is to be deposited, which mask has an uninterrupted portion facing said zone;

an electrode is deposited in the bottom of the depression obtained in this way;

an electro-optical polymer is deposited on the electrode and on the edges of the depression.

Other characteristics and advantages of the invention appear from the following description.

BRIEF DESCRIPTION OF THE SEVERAL VIEWS OF THE DRAWING

This description is given merely by way of non-limiting illustration. It should be read with reference to the accompanying drawings, in which.

DETAILED DESCRIPTION OF THE INVENTION

Figure 1:
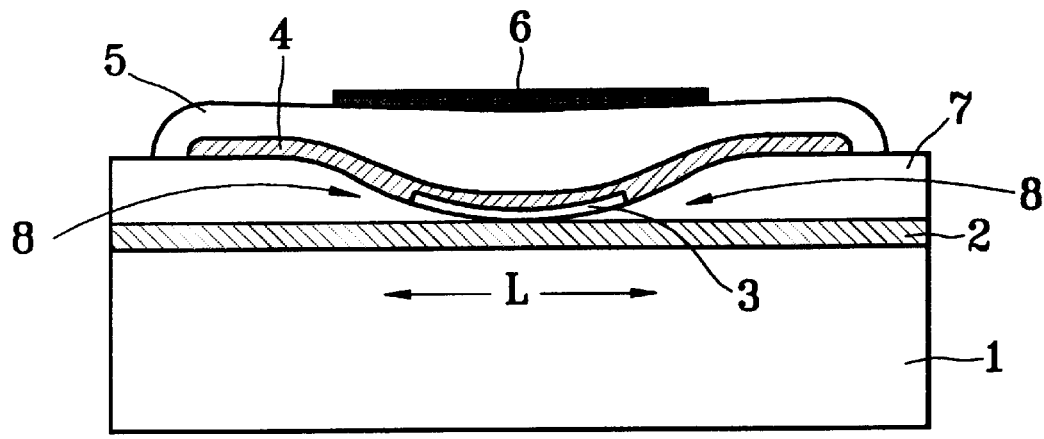
FIG. 1 is diagrammatic longitudinal section view of a possible embodiment of a modulator of the invention.
Figure 2:
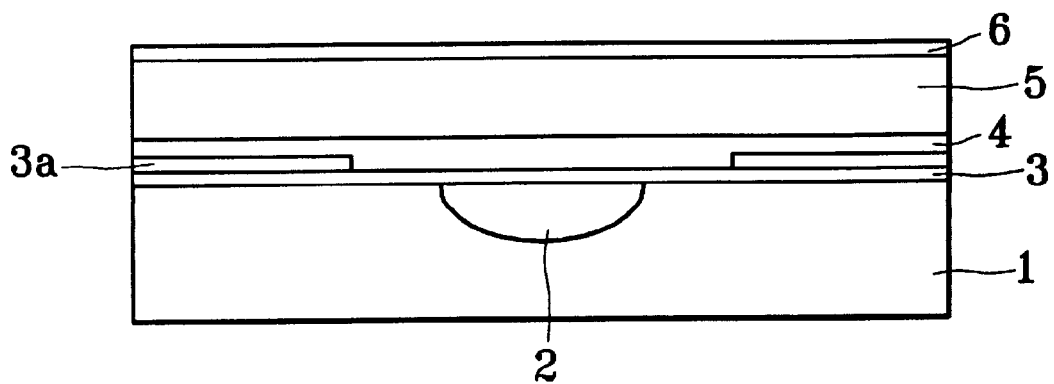
FIG. 2 is a cross-section view of the modulator shown in FIG. 1.

The modulator shown in FIGS. 1 and 2 includes a substrate 1 in which there extends an optical core 2 that has a portion which is unclad.

At the modulation zone, the following are superposed on the core 2: a first electrode 3 that is transparent at the operating wavelength of the component, an electro-optical polymer 4 that has a low refractive index, a protective layer 5, and a second electrode 6.

On either side of the modulation zone, the optical core 2 is merely covered in a dielectric covering layer 7 which acts as optical cladding.

The Pockels effect modulation is performed by exciting the layer of polymer 4 by applying a voltage across the electrodes 3 and 6 so as to generate an electric field E on said layer 4. For this purpose, the dipoles of the polymer 4 are previously oriented in a manner such as to make the material non centrally symmetrical.

At the modulation zone, the light beam that is guided in the core 2 propagates in part in the core 2 and in part in the layer of polymer 4.

Thus, the polymer 4 "participates" in the core material, its thickness and its refractive index being chosen for this purpose. It should be noted in particular that the effectiveness of the modulation of the proposed structure is related to the fact that most of the energy of the mode that propagates in the guide reaches the electro-optical polymer 4 which is subjected to an electric field, with the resulting modulation in the refractive index of said polymer 4 causing the light wave to be phase modulated.

The materials used for the substrate 1 and for the core 2 may be as follows:

for the substrate 1, inorganic glass of any composition type or else silica deposited on glass or on silicon, for example; and for the core 2, the substrate glass as subjected to ion exchange, or else silica doped with germanium oxide and with other dopants such as boron, phosphorus, or fluorine, or any other passive material making it possible to create monomode waveguides.

For example, the material of the substrate may be glass made of P, B, or F doped silica or of $GeO_2$; in a variant, the substrate 1 may be made of Menzel glass, the core 2 then being obtained by $Na^+/K^+$ ion exchange; in another variant, the substrate may be made of special glasses making it possible to create a core by $Na^+/Tl^+$ exchange.

The materials used for the other layers of the structure may be as follows:

for the bottom electrode 3, a material that is both electrically conductive and also transparent at the operating wavelength; this material is chosen to be of thickness such that the optical losses from the beam propagating in the core are minimized; it is thus possible to use a material of the ITO type (based on indium and tin oxide) or of the SnOx type (tin oxide) over thicknesses in the range 5 nm to 30 nm;

the material used for layer 4 is an electro-optical copolymer whose refractive index is adapted so that it is quite close to that of the core, so that it participates in light propagation; the thickness of this layer 4 is small, in particular it is approximately in the range 0.1 $\mu$m to 3 $\mu$m;

for the protective layer 5, the material used may be an organic material of refractive index lower than that of the core, and of electrical resistivity significantly lower than that of the electro-optical polymer;

for the top electrode 6, it is merely necessary to use a material that can be deposited on the protective layer 5 and that is electrically conductive, such as gold, aluminum, chromium, copper, or some other metal; and the material used for the cladding-forming covering layer 7 is a material of refractive index lower than that of the core which is, for example, made of silica.

The structure of the modulation zone is optimized in the following manner. The polymer 4 is spread only over a specific length L of the core, which length depends on the effectiveness of the electro-optical effect and must not exceed a value that would be detrimental to the signal modulation rate. Typically, this length L lies in the range 5 $\mu$m to 30 $\mu$m.

The length L is thus involved in determining the voltage necessary, depending on the orientation field of the dipoles in the polymer, to cause the polarized wave to be phase shifted by $\pi$. The voltage $V\pi$ is given by:

$$V\pi = \lambda \cdot e/(L \cdot n^3 \cdot r33 \cdot X)$$

where $\lambda$ is the wavelength, e is the distance between the electrodes, r33 is the electro-optical coefficient, X is the overlap factor by which the electric field overlaps the optical field, and n is the refractive index of the electro-optical material.

It is at the beginning and at the end of the this zone of length L that the optical losses generated can be large.

In order to avoid such losses, transition zones 8 are provided between firstly the zone in which the polymer 4 is superposed directly on the electrode 3, itself superposed on the core 2, and secondly the zones on either side of the modulation zone, in which the cladding-forming covering dielectric 7 is superposed directly on the core 2. In the transition zones 8, the covering dielectric 7 tapers with its thickness decreasing from the zones in which it forms the cladding down to the electrode 3; the polymer 4 extends beyond the electrode 3 and covers the dielectric 7 over the entire depression defined by the transition zones, and over the edges of said depression.

The taper makes it possible for the optical field to rise slightly as soon as it approaches the depression in which the polymer 4 is situated and, conversely, for it to couple back into the core 2 of the guide as it leaves the polymer. Optical losses which would otherwise amount to several dB are thus avoided.

Figure 3:
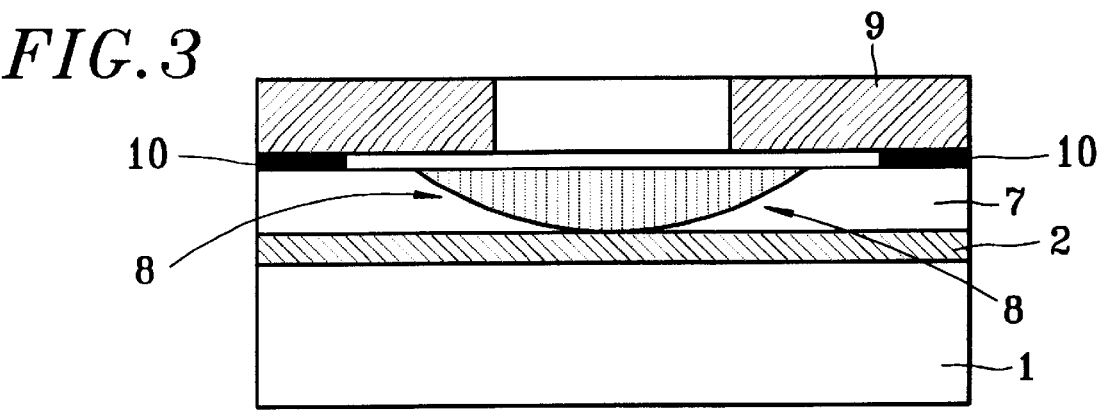
FIG. 3 is a diagrammatic longitudinal section view showing how transition zones are formed on the cladding of the structure shown in FIGS. 1 and 2.

A preferred technique for tapering the edges of the dielectric 7 is shown in FIG. 3.

The taper configuration is obtained while etching the covering dielectric layer 7 deposited after the electrode layer 3.

The covering layer 7 is initially deposited over the entire length of the component, e.g. by conventional plasma deposition. For etching the layer so as to form a depression for receiving the polymer 4, a mechanical mask 9 is used to protect the deposited portion that is to be preserved. Rather than being applied against the silica of the covering layer, the mask 9 must be placed at a certain distance therefrom, e.g. at a distance lying in the range 0.2 $\mu$m to 200 $\mu$m. This distance is obtained by interposing shims 10. The etching plasma then causes the silica to be etched on a gradient which imparts the desired taper configuration to it.

A spinner is used to spread the electro-optical polymer 4 over the resulting component, over the thicknesses given above, and the protective layer 5 is then deposited.

The layers are then etched so that they cover only the depression and the transition zones 8.

It should be noted that the larger the distance between the mask 9 and the layer 7, the gentler the slope of the layer 7 in the transition zone. The gentle slopes make it possible for the shapes of the fields to vary progressively ("adiabatic" transition), thereby making it possible to minimize the coupling losses between the various portions of the structure. In addition, they make it easy for the depressions to filled merely by deposition using a spinner.

Implementation details are given below for a possible example of a component.

Figure 4A:
FIGS. 4a to 4g show various steps in obtaining a light guide structure having a core that is unclad and that is made of an inorganic amorphous material.
Figure 4D:
Figure 4B:
Figure 4E:
Figure 4C:
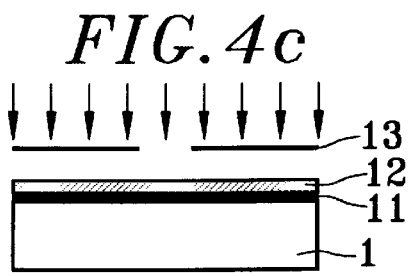
Figure 4F:
Figure 4G:
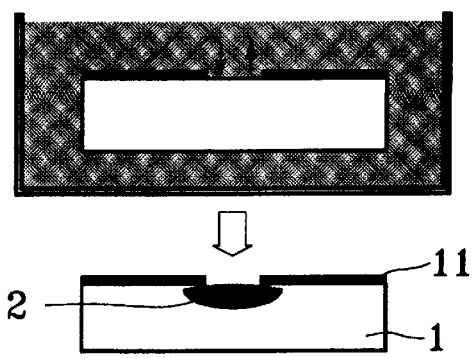

Ion exchange is performed by using, for example, Menzel-type glass plates or other types of glass plates making it possible for $Na^+/K^+$ ion exchange or $Na^+/Tl^+$ ion exchange to be achieved. This preparation is performed using the various steps shown in FIGS. 4a to 4g, namely:

deposition of a masking layer 11 on a layer of the material used to constitute the substrate 1 (FIG. 4a);

deposition of a layer of resin 12 that is sensitive to ultraviolet radiation (FIG. 4b);

exposure to ultraviolet radiation through a mask 13 provided with a longitudinal opening of width corresponding to the width of the core that is to be formed (FIG. 4c);

development so as to remove the portion of the resin that has been exposed (FIG. 4d);

wet etching so as to remove that portion of the masking layer which has been uncovered (FIG. 4e);

removal of the resin 12 by dissolving it (FIG. 4f); and ion exchange in a bath of molten salts so as to form the core 2 (FIG. 4g).

Figure 5:
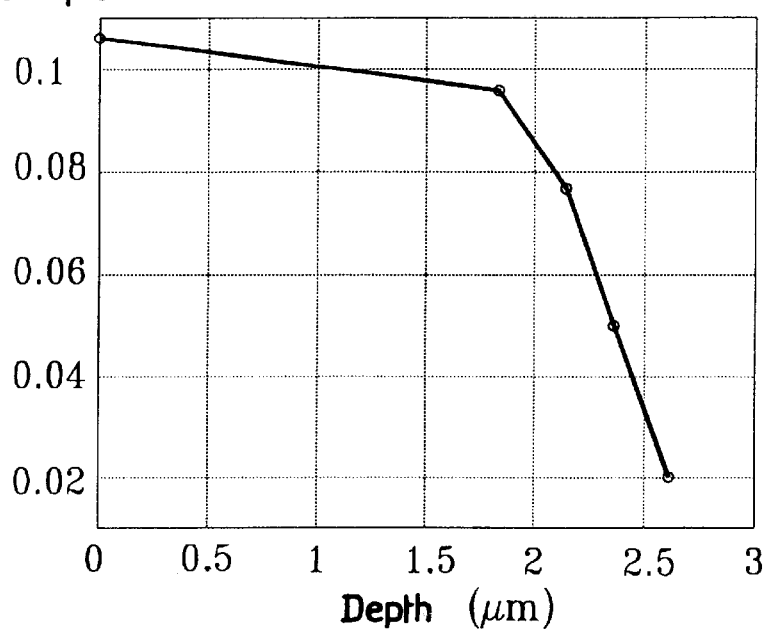
FIGS. 5 to 8 are graphs illustrating a structure in a possible embodiment of the invention.
Figure 6:
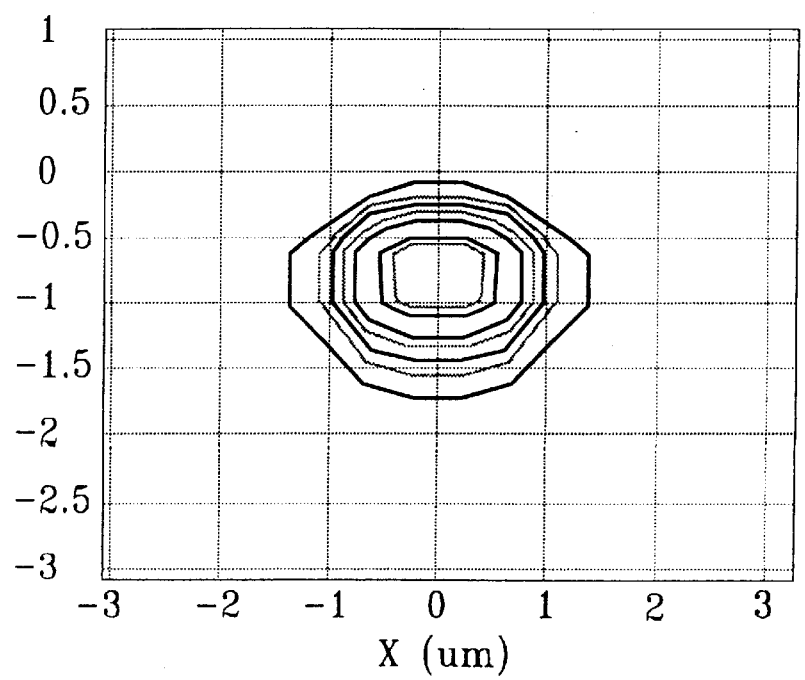

A component is thus obtained that has a light guide with a core having an unclad portion and whose refractive index distribution and field profile are given in FIGS. 5 and 6. In FIG. 6, the X-axis and the Y-axis correspond respectively to the width direction and to the depth direction of the waveguide.

The propagation losses are about 0.3 dB/cm at a wavelength of 1.3 $\mu$m.

The size and refractive index configuration of the light guide is such that it is a monomode waveguide at a wavelength of 1.3 $\mu$m.

A Mach-Zehnder type interferometer circuit is then formed on the resulting component by being drawn on the masking layer 11.

Then, by using the technique described with reference to FIG. 3, a layer of silica $SiO_2$ is deposited. This layer serves to form cladding 7.

The mask 9 used for the silica deposition is a metal plate held by shims at a certain distance from the workpiece. The silica deposition is obtained by spraying silica using a standard argon plasma, to which oxygen is added. Typically, the length of the depression is about 1 cm, with each transition zone being about one millimeter long.

Then a length L, e.g. equal to 15 mm of SnOx is deposited on the core of the guide by being sprayed through a mask.

This layer of SnOx is extended on the sides, e.g. by layers of glass 3a, so as to obtain an electrical contact, and thus to form the first electrode (electrode 3). The thickness of the layer is only 10 nm so as not to cause optical losses that are too great.

Other variant embodiments of the depression may be considered.

In particular, instead of etching the silica layer, it is possible to deposit it through a mask which, unlike mask 9, presents a portion above the zone in which the core 2 interacts with the polymer layer. Like the mask 9, this mask is spaced apart by a certain distance (in the range 0.5 mm to 1 mm) from the glass slide. The resulting layer as deposited through the mask is then directly taper shaped.

The resulting depression, as formed by either of the above-described methods, is covered in an electro-optical polymer which is synthesized with lateral structural units constituted by aromatic azo chromophores of the type of those sold under the name "Disperse Red 1" by Sygma-Aldrich.

Other structural units may also be added during the synthesis so as to adapt the refractive index of the electro-optical material.

Preferably, the refractive index of the polymer 4 lies in the range 1.4 to 1.7 at 1.3 $\mu$m.

Its electro-optical coefficient is greater than 10 p$\mu$m/V.

The polymer is deposited in the SnOx depression by means of a spinner. The thickness of the polymer is 0.5 $\mu$m. The electrical resistivity of the polymer is about $10^{14}$ $\Omega \cdot$cm. A buffer layer of adhesive that can be polymerized by being exposed to UV radiation is deposited on the polymer so as to form the protective layer 5. For example, the adhesive sold under the name "SK9" by Summers Optical Co. may be used for this purpose. The refractive index of this adhesive at 1.3 $\mu$m is 1.47. Its resistivity is about half that of the electro-optical polymer that it covers.

Then, a layer of aluminum is deposited on the adhesive by being sprayed through a mask, which layer of aluminum has a thickness of about 200 nm, and serves to constitute the electrode 6.

Once this structure has been finished, it is necessary to make the electro-optical polymer non centrally symmetrical. For this purpose, a high electric field is applied between the two electrodes 3 and 6. for example, this field may be approximately in the range 100 V/$\mu$m to 200 V/$\mu$m. It is applied between the electrodes 3 and 6 for a first duration of about fifteen minutes, during which the polymer is maintained at a temperature slightly higher than its vitreous transition temperature, i.e. about 80° C. in the above-described example, and then after this first period until the structure returns to an ambient temperature in the vicinity of 20° C.

The modulator is then ready to operate, it being necessary for the modulating electrical signal to be applied between the electrodes 3 and 6.

Figure 7:
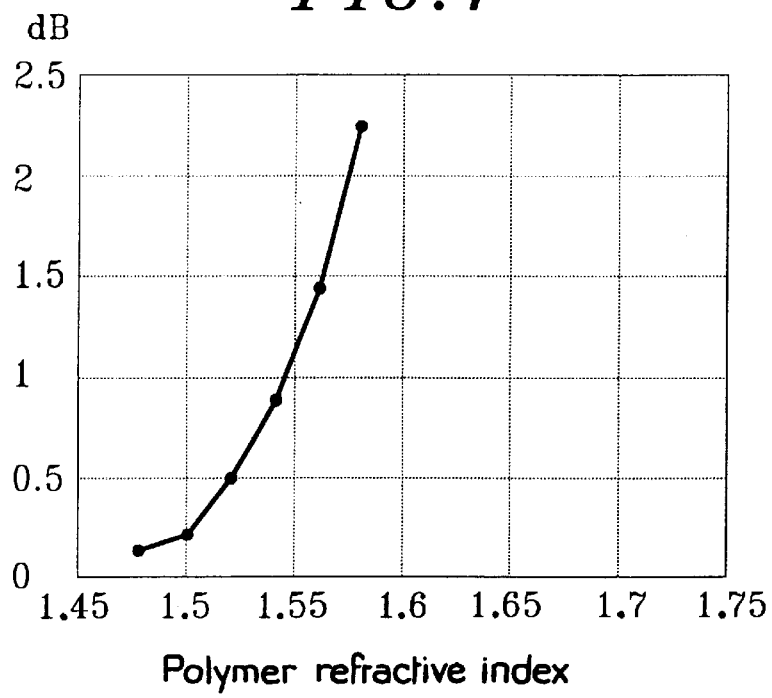

The coupling losses in the active zone are given by FIG. 7 as a function of the refractive index of the layer of polymer 4, when said layer has a thickness of 0.5 μm. It can be noted that, for a refractive index of about 1.55, losses are about 1 dB, which is quite acceptable. With a sharp transition between the polymer 4 and the layer 7, i.e. without the transition zones 8, losses would be much higher (>5 dB).

Figure 8:
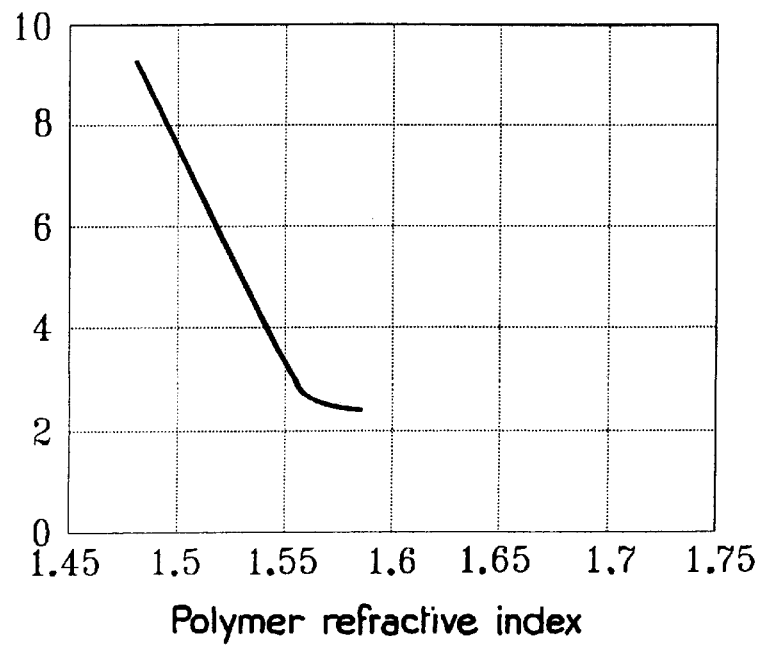

FIG. 8 shows the variation in the control voltage Vπ as defined above as a function of the refractive index of the polymer, when the layer 4 has a thickness of 0.5 μm.

What is claimed is:

1. A Pockels-effect electro-optical modulator including a light guide having a core made of an inorganic amorphous material, and on which a structure is superposed that is made up of two electrode-forming layers between which an electro-optical polymer is interposed, said structure being superposed directly on the material of the core of the light guide, said modulator being characterized in that it includes a layer of cladding-forming material which extends over the core material on either side of the structure comprising the two electrode-forming layers and the electro-optical polymer, and which, in the vicinity of said structure, has transition zones in which its thickness decreases down to the electrode superposed on the core material, the electro-optical polymer covering said cladding-forming material in the transition zones defined in this way.

2. A modulator according to claim 1, characterized in that the electro-optical polymer is covered in a protective layer whose refractive index is lower than the refractive index of the core.

3. A modulator according to claim 1 or claim 2, characterized in that the electrode which is superposed on the core of the light guide is made of a material that is both electrically conductive and also transparent at the operating wavelength.

4. A modulator according to claim 3, characterized in that said material is a material based on tin oxide.

5. A modulator according to claim 1, characterized in that the structure comprising the two electrode-forming layers and the electro-optical polymer superposed on the core is of a length lying in the range 5 mm to 30 mm.

6. A method of making an electro-optical modulator, said method being characterized by the following steps:

a structure is made that includes a light guide having a core that is unclad and that is made of an inorganic amorphous material;

a layer of a material serving to constitute cladding for said core is deposited on said structure;

said layer is etched through a mask;

an electrode is deposited in the bottom of the etched zone;

an electro-optical polymer is deposited on the electrode and on the edges of the etched zone; and an electro-optical polymer is deposited in the etched zone.

7. A method according to claim 6 for making a modulator, said method being characterized in that the etching is performed by plasma etching, and in that the mask is spaced apart from the cladding.

8. A method according to claim 7, characterized in that, in order to space the mask apart from the cladding, shims are disposed between said mask and said cladding.

9. A method according to claim 7 or 8, characterized in that the polymer is deposited on the electrode and on the transition zones defined on the cladding during said etching.

10. A method of making an electro-optical modulator according to claim 3, said method being characterized by the following steps:

a structure is made that includes a light guide having a core that is unclad and that is made of an inorganic amorphous material;

cladding is deposited by plasma on said structure while interposing a mask facing the zone in which the electro-optical polymer is to be deposited, which mask has an uninterrupted portion facing said zone;

an electrode is deposited in the bottom of the depression obtained in this way;

an electro-optical polymer is deposited on the electrode and on the edges of the depression.

* * * * *

UNITED STATES PATENT AND TRADEMARK OFFICE
CERTIFICATE OF CORRECTION

PATENT NO. : 6,185,033 B1  
DATED : February 6, 2001  
INVENTOR(S) : Bosc et al.

Page 1 of 1

It is certified that error appears in the above-identified patent and that said Letters Patent is hereby corrected as shown below:

<u>Column 8, claim 10,</u>  
Line 26, delete "according to claim 3".

Signed and Sealed this

Twenty-sixth Day of March, 2002

*Attest:*

JAMES E. ROGAN  
*Attesting Officer*     *Director of the United States Patent and Trademark Office*